United States Patent
Ding et al.

(10) Patent No.: US 10,652,513 B2
(45) Date of Patent: May 12, 2020

(54) DISPLAY DEVICE, DISPLAY SYSTEM AND THREE-DIMENSION DISPLAY METHOD

(71) Applicant: BOE Technology Group Co., Ltd., Beijing (CN)

(72) Inventors: Xiaoliang Ding, Beijing (CN); Xue Dong, Beijing (CN); Haisheng Wang, Beijing (CN); Yingming Liu, Beijing (CN); Pengpeng Wang, Beijing (CN); Yanling Han, Beijing (CN); Ping Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 22 days.

(21) Appl. No.: 16/038,787

(22) Filed: Jul. 18, 2018

(65) Prior Publication Data
US 2019/0208176 A1    Jul. 4, 2019

(30) Foreign Application Priority Data
Jan. 2, 2018 (CN) .......................... 2018 1 0001011

(51) Int. Cl.
| H04N 13/128 | (2018.01) |
| H04N 5/33 | (2006.01) |
| H04N 5/235 | (2006.01) |
| H04N 5/232 | (2006.01) |
| G02B 30/00 | (2020.01) |

(52) U.S. Cl.
CPC ......... *H04N 13/128* (2018.05); *H04N 5/2353* (2013.01); *H04N 5/23229* (2013.01); *H04N 5/23238* (2013.01); *H04N 5/33* (2013.01)

(58) Field of Classification Search
None
See application file for complete search history.

(56) References Cited

U.S. PATENT DOCUMENTS

| 2012/0038751 A1* | 2/2012 | Yuan | .................. | H04N 5/23232 348/51 |
| 2012/0056982 A1* | 3/2012 | Katz | ...................... | G06F 3/017 348/43 |

(Continued)

FOREIGN PATENT DOCUMENTS

| CN | 101742349 A | 6/2010 |
| CN | 104780315 A | 7/2015 |

(Continued)

OTHER PUBLICATIONS

Chinese Office Action for counterpart CN201810001011.X dated Mar. 20, 2019.

*Primary Examiner* — Yingchun He
(74) *Attorney, Agent, or Firm* — Arent Fox LLP; Michael Fainberg

(57) ABSTRACT

The disclosure discloses a display device, a display system and a three-dimension display method. The display device includes a display panel and at least one camera device arranged on the periphery of the display panel, where each of the at least one camera device includes at least two depth cameras, and a depth-of-field range of any one of the depth cameras does not fully overlap with depth-of-field ranges of the other depth cameras; and the display panel is configured to display a 3D image formed by processing image information captured by the at least one camera device.

19 Claims, 7 Drawing Sheets

(56) References Cited

U.S. PATENT DOCUMENTS

2017/0024044 A1    1/2017  Li
2017/0237971 A1    8/2017  Pitts
2018/0364483 A1*  12/2018  Mallinson ............... G01S 17/42

FOREIGN PATENT DOCUMENTS

| CN | 104991684 | A |   | 10/2015 |             |
|----|-----------|---|---|---------|-------------|
| CN | 106612392 | A |   |  5/2017 |             |
| CN | 107103626 | A |   |  8/2017 |             |
| CN | 107113379 | A | * |  8/2017 | ............. G06T 15/00 |
| CN | 107113379 | A |   |  8/2017 |             |

* cited by examiner

DISPLAY DEVICE, DISPLAY SYSTEM AND THREE-DIMENSION DISPLAY METHOD

CROSS-REFERENCES TO RELATED APPLICATIONS

This application claims priority to Chinese patent application No. 201810001011.X filed on Jan. 2, 2018, which is incorporated herein by reference in its entirety.

FIELD

The present disclosure relates to the field of display technologies, and particularly to a display device, a display system and a three-dimension display method.

BACKGROUND

With the rapid development of the 3D technologies in the field of display technologies, there are a growing variety of display products based on the 3D technologies. At present, devices for their human operators to interact with a 3D space model in a display device are increasingly popular to the users because interaction in a 3D space can provide the human operators with a more vivid 3D interaction experience than interaction in a plane.

SUMMARY

In one aspect, an embodiment of the disclosure provides a display device, which includes a display panel and at least one camera device arranged on a periphery of the display panel, wherein: each of the at least one camera device includes at least two depth cameras, and a depth-of-field range of any one of the depth cameras does not fully overlap with depth-of-field ranges of the other depth cameras; and the display panel is configured to display a 3D image which is formed by processing image information captured by the at least one camera device.

In a possible implementation, in the display device according to the embodiment of the disclosure, the camera device further includes a light emitter adjacent to each of the depth cameras; the light emitter is configured to emit light at a preset wavelength to an object; and each of the depth cameras is configured to photograph the object, and to receive the light at the preset length reflected by the object to obtain the image information.

In a possible implementation, in the display device according to the embodiment of the disclosure, the depth cameras in the same camera device share one light emitter.

In a possible implementation, in the display device according to the embodiment of the disclosure, exposure times of the depth cameras in the same camera device do not overlap with each other.

In a possible implementation, in the display device according to the embodiment of the disclosure, exposure intensities as needed for the depth cameras in the same camera device increase with the growing depth-of-field ranges of the depth cameras; and emission intensity of the light emitter increases with the growing depth-of-field ranges of the depth cameras.

In a possible implementation, in the display device according to the embodiment of the disclosure, the camera device includes a plurality of depth cameras arranged around the light emitter.

In a possible implementation, in the display device according to the embodiment of the disclosure, the display panel is a rectangular display panel, and the at least one camera device is arranged on two longer sides of the display panel; and an angle of view of each camera device satisfies the relationship of:

$$FOV \geq 2 \arctan(a/\sqrt{2}h);$$

wherein FOV is the angle of view of the camera device, $h$ is a near depth-of-field of the camera device, and $a$ is a length of a shorter side of the display device.

In a possible implementation, in the display device according to the embodiment of the disclosure, the number of camera devices arranged on either longer side of the display panel is an integer more than or equal to $b/a$; wherein $b$ is a length of a longer side of the display panel, and $a$ is the length of a shorter side of the display panel.

In a possible implementation, in the display device according to the embodiment of the disclosure, an angle between a dominant optical axis of each of two camera devices on two ends of either longer side of the display panel and the longer side is preset.

In a possible implementation, in the display device according to the embodiment of the disclosure, the angles of views of the respective camera devices arranged on either longer side of the display panel are superposed to result in a coverage range of 180 degrees or more.

In a possible implementation, in the display device according to the embodiment of the disclosure, each camera device further includes at least one wide-angle camera.

In another aspect, an embodiment of the disclosure provides a display system including a display device and a processor, where: the display device includes a display panel and at least one camera device arranged on a periphery of the display panel, wherein each of the at least one camera device includes at least two depth cameras, and a depth-of-field range of any one of the depth cameras does not fully overlap with depth-of-field ranges of the other depth cameras; the processor is configured to receive image information captured by the at least one camera device in the display device, to process the image information to obtain a 3D image, and to transmit the 3D image to the display panel; the display panel is configured to display the 3D image.

In a possible implementation, in the display system according to the embodiment of the disclosure, the camera device further includes a light emitter adjacent to each of the depth cameras; the light emitter is configured to emit light at a preset wavelength to an object; and each of the depth cameras is configured to photograph the object, and to receive the light at the preset length reflected by the object to obtain the image information.

In a possible implementation, in the display system according to the embodiment of the disclosure, the depth cameras in the same camera device share one light emitter.

In a possible implementation, in the display system according to the embodiment of the disclosure, exposure times of the depth cameras in the same camera do not overlap with each other.

In a possible implementation, in the display system according to the embodiment of the disclosure, exposure intensities as needed for the depth cameras in the same camera device increase with the growing depth-of-field ranges of the depth cameras; and emission intensity of the light emitter increases with the growing depth-of-field ranges of the depth cameras.

In a possible implementation, in the display system according to the embodiment of the disclosure, the camera device includes a plurality of depth cameras arranged around the light emitter.

In another aspect, an embodiment of the disclosure provides a three-dimension display method based upon the display device above. The method includes: photographing, by the depth cameras in the at least one camera device, an object to obtain image information; processing the image information to obtain the 3D image, and transmitting the 3D image to the display panel; and displaying, by the display panel, the 3D image.

In a possible implementation, in the method according to the embodiment of the disclosure, the camera device further includes a light emitter adjacent to each of the depth cameras; and photographing, by the depth cameras in the at least one camera device, the object includes: driving the light emitter in a time division mode in a descending order of emission intensities according to preset timing to emit a light beam at a preset wavelength to the object, and driving the depth cameras in the at least one camera device in sequence in a descending order of their depths of fields to photograph the object.

In a possible implementation, in the method according to the embodiment of the disclosure, the camera device further includes at least one wide-angle camera; and photographing, by the depth cameras in the at least one camera device, the object includes: photographing, by the at least one wide-angle camera, the object; analyzing image information captured by the at least one wide-angle camera, and determining a positional range of the object; and driving the depth camera corresponding to the positional range according to the positional range to photograph the object.

BRIEF DESCRIPTION OF THE DRAWINGS

In order to make the technical solutions in the embodiments of the disclosure more apparent, the drawings to be used in a description of the embodiments will be briefly introduced below, and apparently the drawings to be described below are merely illustrative of some embodiments of the disclosure, and those ordinarily skilled in the art can derive from these drawings other drawings without any inventive effort.

DETAILED DESCRIPTION

In view of the problem in the related art, embodiments of the disclosure provide a display device, a display system and a three-dimension display method so as to extend the depth-of-field range for short-distance operation and interaction.

In order to make the objects, technical solutions, and advantages of the embodiments of the disclosure more apparent, the disclosure will be described below in further details with reference to the drawings, and apparently the embodiments described below are only a part but not all of the embodiments of the disclosure. Based upon the embodiments of the disclosure, all the other embodiments which can occur to those skilled in the art without any inventive effort shall fall into the scope of the disclosure.

A display device and a three-dimension display method thereof according to the embodiments of the disclosure will be described below in details with reference to the drawings.

In related art, the interaction in a 3D space is generally based upon the positioning technologies in a 3D space. The most common space positioning technologies include the binocular, structurally optical, and Time of Flight (TOF) ranging technologies, all of which operate with a camera, where the camera is generally a camera with a fixed focus, so the space positioning technologies suffer from the following two problems: firstly the detection precision of the camera with a fixed focus is higher in the depth-of-field range, but drops dramatically out of the depth-of-field range; and secondly there is a limited operating space of the space positioning devices, so there is a large blind area for a short-distance operation.

Figure 1:
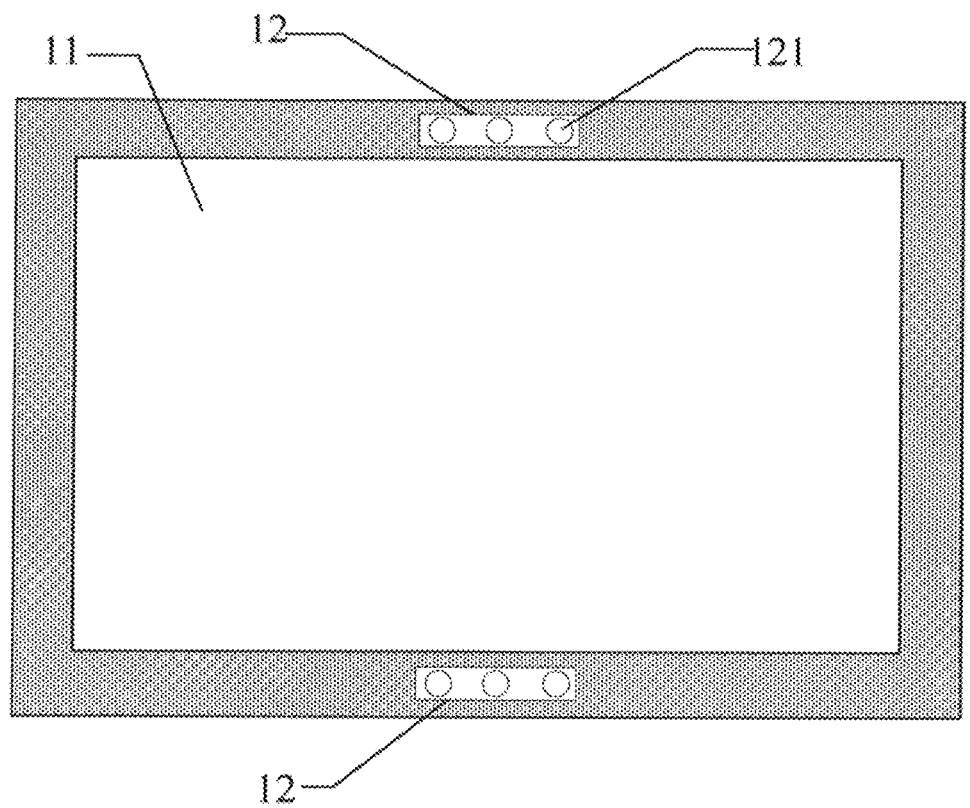
FIG. 1 is a first schematic structural diagram of a display device according to an embodiment of the disclosure in a front view.

As illustrated in FIG. 1, a display device according to an embodiment of the disclosure includes a display panel 11, and at least one camera device 12 arranged on the periphery of the display panel.

Each of the at least one camera device 12 includes at least two depth cameras 121, and a depth-of-field range of any one of the depth cameras does not fully overlap with depth-of-field ranges of the other depth cameras.

The display panel 11 is configured to display a 3D image formed by processing image information captured by the at least one camera device 12.

In a real application, the display panel above according to the embodiment of the disclosure can be a liquid crystal display panel, an Organic Light-Emitting Diode (OLED) display panel, an electronic paper, or another display terminal. The at least one camera device 12 is integrated on a bezel of the display panel so that the display device is provided with a function of capturing a depth image. Furthermore the camera device 12 includes the at least two depth cameras 121 with their depth-of-field ranges which do not fully overlapping with each other. These depth cameras have high precision of photographing in their respective depth-of-field ranges, and the depth-of-field ranges of a plurality of depth cameras can be superposed to thereby extend a depth-of-field range in which the camera device can capture an image clearly. In some embodiments, the depth-of-field ranges of the plurality of depth cameras can be superposed to a consecutive depth-of-field range. For example, the camera device includes two depth cameras, where the depth-of-field range of one depth camera is [a, b], and the depth-of-field range of the other depth camera is [b, c], where a<b<c, so the depth-of-field ranges of these two depth cameras can be consecutive, so that the camera device can capture an image precisely in the depth-of-field range [a, c]. In a real application, the depth cameras above can capture both 2D grayscale information and depth information, the grayscale information and depth information can be processed to obtain a 3D image including a grayscale and a depth, and the display panel can display the 3D image. Image processing can be performed by the camera device, or can be performed by a separate processor. The camera device and the processor can be arranged separate from the display panel, or can be integrated in the display panel. Furthermore imaging processing can be performed in software (e.g., an image processing module), or can be performed in hardware, e.g., a processing module with a data processing capability and/or a program executing capability, including one or more of a processor, a single chip microcomputer, a Digital Signal Processor (DSP), an Application Specific Integrated Circuit (ASIC), or other devices. For example, the processor can be a Central Processing Unit (CPU), a Field Programmable Gate Array (FPGA), a Tensor Processing Unit (TPU), etc. The processing module can include one or more chips in the devices above.

While the display panel is displaying an image of some scene, and a user is interacting with the scene in front of the display panel, the position and action of the user, moving in a large range of the distance between the user in front of the display panel and the display panel, can be captured accurately, and then processed, so that the display panel 11 can display a 3D image into which a captured image of the user is integrated, to thereby display the user (or an object) in the scene of the originally displayed image in a 3D mode. In the display device above according to the embodiment of the disclosure, the depth-of-field range for photographing can be extended, and the depth-of-field ranges of the respective depth cameras can be set as needed in a real application to thereby satisfy a demand for short-distance operation and interaction.

Figure 2:
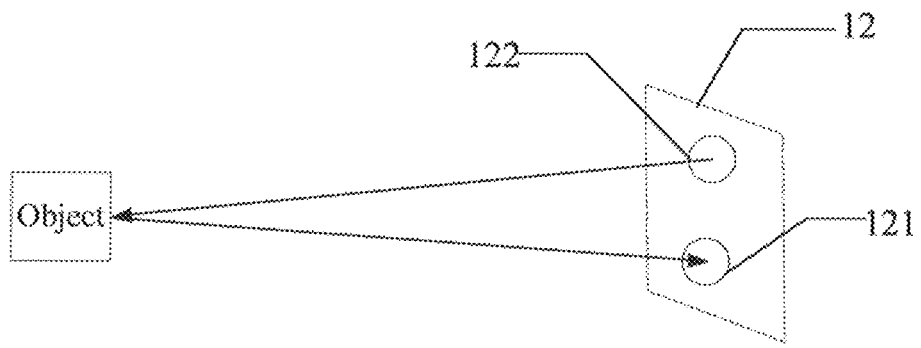
FIG. 2 is a first schematic structural diagram of a camera device according to an embodiment of the disclosure.

In some embodiments, in the display device above, as illustrated in FIG. 2, the camera device 12 may further include a light emitter 122 adjacent to the respective depth cameras 121.

Each light emitter 122 is configured to emit light at a preset wavelength to the object.

The depth camera 121 is configured to photograph the object, and to receive the light at the preset length reflected by the object to obtain the image information.

Figure 3:
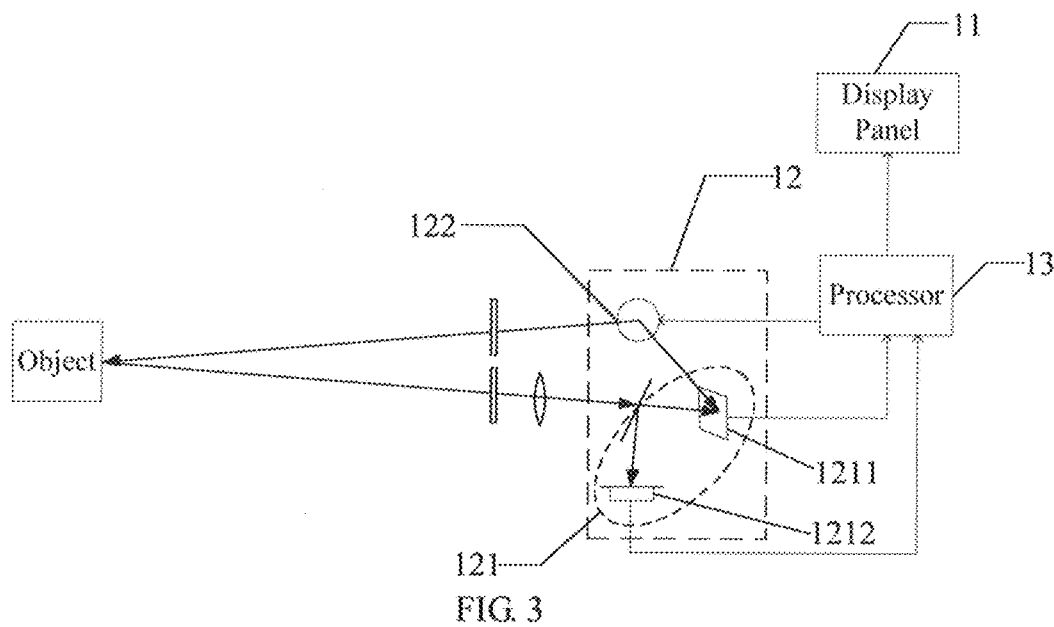
FIG. 3 is a principle diagram of imaging according to an embodiment of the disclosure.

The distance between the object and the display panel is determined by analyzing the difference in waveform phase between the light at the preset length emitted by the light emitter 122, and the light at the same preset wavelength received by the depth camera 121. In some embodiments, the camera device above may be a depth camera device using TOF technique, the structure thereof is as illustrated in FIG. 3. For the sake of a convenient description of the principle, FIG. 3 schematically illustrates the respective components in blocks, but shall not represent their real positions or real sizes. As illustrated in FIG. 3, the light emitter 122 in the camera device 12 may be an infrared laser emitter, and the depth camera 121 may be an infrared camera. In a real application, the infrared camera 121 may include an array of photoelectric diodes 1211 configured to receive and convert infrared laser into an electric signal, and an image sensor 1212 (e.g., a CCD, a CMOS, etc.) configured to acquire a 2D grayscale image. Furthermore the array of photoelectric diodes 1211 and the image sensor 1212 are connected respectively with the processor 13. The processor 13 may control the emission intensity of the infrared laser emitter 122, and may also receive the electric signal transmitted by the array of photoelectric diodes 1211, and may further analyze the difference in waveform phase between the laser emitted by the infrared laser emitter 122, and the laser reflected by the object to thereby obtain depth information of the photographed object. The processor also receives the 2D image acquired by the image sensor 1212 to obtain grayscale information of the photographed object. The processor 13 can process the grayscale information and depth information to obtain a 3D image including the photographed object and an application scene, and transmit the 3D image to the display panel on which the 3D image can be displayed.

Figure 4:
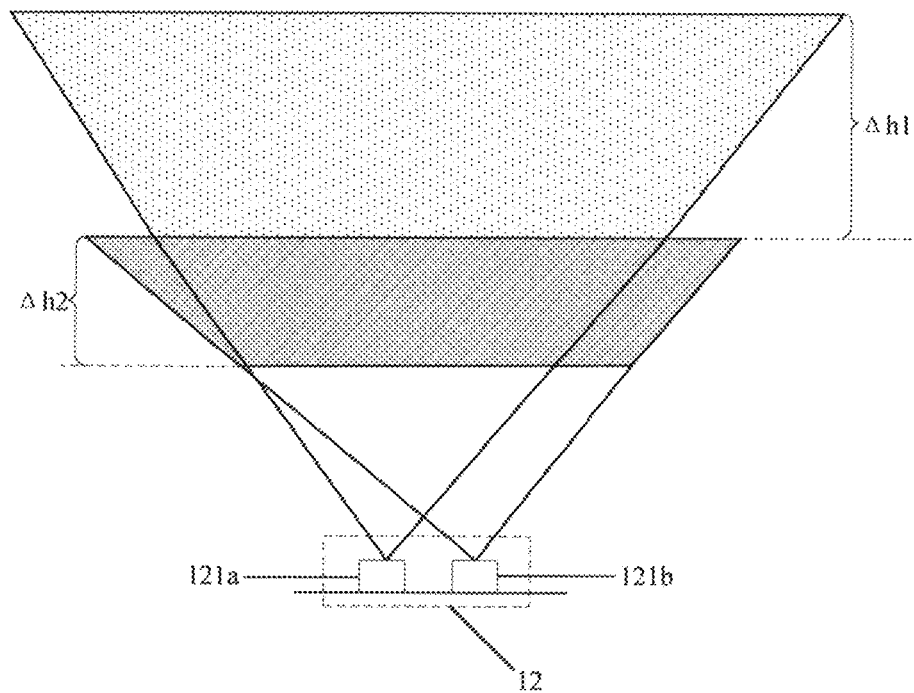
FIG. 4 is a first schematic diagram of a depth of field for imaging by the camera device according to the embodiment of the disclosure.

In some embodiments, the camera device 12 includes at least two depth cameras 121, and there are different depth-of-field ranges for the respective depth cameras 121, where the respective depth-of-field ranges can be consecutive in an ascending order of their distances from the display panel. Taking the structure as illustrated in FIG. 4 as an example, the camera device 12 includes two infrared cameras 121a and 121b, and one infrared laser emitter (not shown). The depth-of-field range of the infrared camera 121a is Δh1, and the depth-of-field range of the infrared camera 121b is Δh2; and as can be apparent from FIG. 4, after the depth-of-field ranges of the two infrared cameras are superposed, the resulting depth-of-field is consecutive, so the camera device including these two infrared cameras 121a and 121b can have high precision in the depth-of-field range Δh1+Δh2, so that the depth-of-field range can be extended as compared with the structure with a single camera, and clear imaging can be enabled in the extended depth-of-field range. If there are a larger number of cameras with short-distance depth-of-field ranges, then there may be an application scenario in which short-distance operation and interaction is performed. In the embodiment of the disclosure, a camera device includes two depth cameras, for example, but in a real application, a camera device may further include more depth cameras to provide a wider depth-of-field range, although the embodiment of the disclosure will not be limited thereto.

Depth-of-field ranges, for photographing, of a plurality of depth cameras in the same camera device are not fully the same, that is, there are different ranges of distances which can be detected by the respective depth cameras, and the energy of light emitted by a light emitter is related to a transmission distance. In order to avoid the problem of underexposure of some depth cameras, and excessive exposure of some another depth camera, exposure times of the respective depth cameras in the same camera device do not overlap with each other in some embodiments of the disclosure. Stated otherwise, the respective depth cameras are driven in a time division mode to expose in sequence so that exposure of the respective depth cameras does not affect each other, and the light emitters are driven at appropriate power according to the depth-of-field ranges of the respective depth cameras so that each depth camera can operate in an optimum exposure state while the object is lying in the depth-of-field range of the depth camera. Lens structures of the depth cameras are adjusted to thereby have their lengths of focus, and imaging distances varied accordingly, thus resulting in a different depth-of-field range for photographing. Furthermore the depth-of-field range for photographing can alternatively be adjusted otherwise directly, although the embodiment of the disclosure will not be limited thereto.

As described above, the depth-of-field ranges for photographing by the respective depth cameras are not fully the same so that there is different energy of light as needed for the respective depth cameras, so in some embodiments of the disclosure, the exposure intensities as needed for the respective depth cameras in the same camera device increase with the growing depth-of-field ranges of the respective depth cameras, and then the emission intensity of the light emitter increases with the growing depth-of-field ranges of the respective depth cameras.

By way of an example, when a camera device 12 includes one light emitter 122 (which may be an infrared laser emitter) and three depth cameras (which may be infrared cameras) 121a, 121b, and 121c, where the depth-of-field range for photographing of the depth camera 121a is farther than the depth-of-field range for photographing of the depth camera 121b, and the depth-of-field range for photographing of the depth camera 121b is farther than the depth-of-field range for photographing of the depth camera 121c, then the energy of light as needed for the depth camera 121a may be more than the energy of light as needed for the depth camera 121b, and the energy of light as needed for the depth camera 121b may be more than the energy of light as needed for the depth camera 121c, so when the depth cameras 121a, 121b, and 121c are exposing in sequence, the emission intensity of the light emitter 122 corresponding to the depth camera 121a is higher than the emission intensity thereof corresponding to the depth camera 121b, and the emission intensity thereof corresponding to the depth camera 121b is higher than the emission intensity thereof corresponding to the depth camera 121c.

Figure 5:
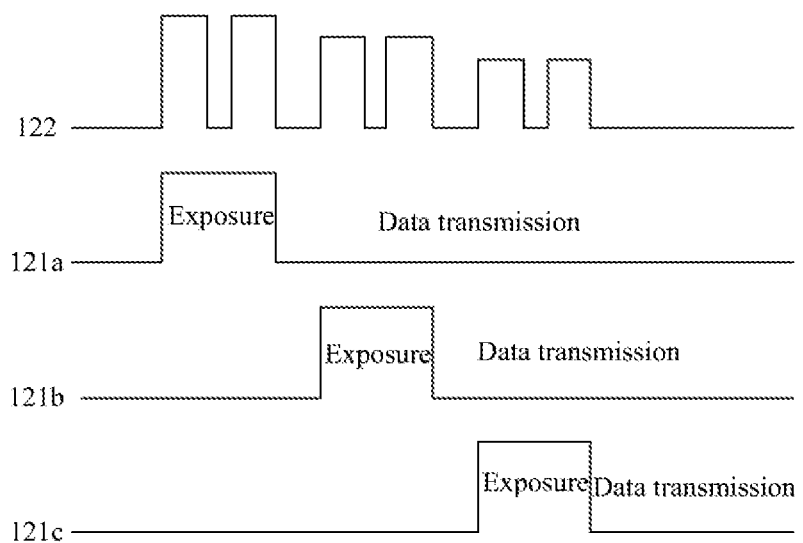
FIG. 5 is a first timing diagram of exposure according to an embodiment of the disclosure.

In some embodiments, one light emitter may be common to respective depth cameras in the same camera device. Still taking as an example the camera device above including three depth cameras 121a, 121b, and 121c, and one light emitter 122, FIG. 5 illustrates a timing diagram of emitting by the light emitter 122 in a real application. The pulse height corresponding to the light emitter 122 represents the emission intensity of emitted light, and the pulse width represents a duration of the emitted light. The depth cameras 121a, 121b, and 121c are exposing and photographing for the time periods corresponding to the pulse widths, and transmitting data in other time periods than the pulses. As described above, the depth-of-field range for photographing of the depth camera 121a is farther than the depth-of-field range for photographing of the depth camera 121b, and the depth-of-field range for photographing of the depth camera 121b is farther than the depth-of-field range for photographing of the depth camera 121c, so when the three depth cameras 121a, 121b, and 121c are exposing in sequence under the rule as described above, the timing of emission of the light emitter 122 is determined respectively in correspondence to the time periods for the three exposure pulses, and emission intensities thereof are integrated into the timing of emission in a descending order, so that it emits a strong beam at a preset wavelength in the exposure time period for the depth camera 121a, a weak beam at the preset wavelength in the exposure time period for the depth camera 121b, and a weaker beam at the preset wavelength in the exposure time period for the depth camera 121c. Furthermore the exposure time period of the camera is much shorter than the time period for data transmission, even if the plurality of cameras exposes in sequence, the photographing processes of respective cameras can be completed in one frame as long as the exposure time periods of respective cameras are compact. Therefore, usage of plurality of cameras can rarely affect the frame rate of the photographing.

Figure 6:
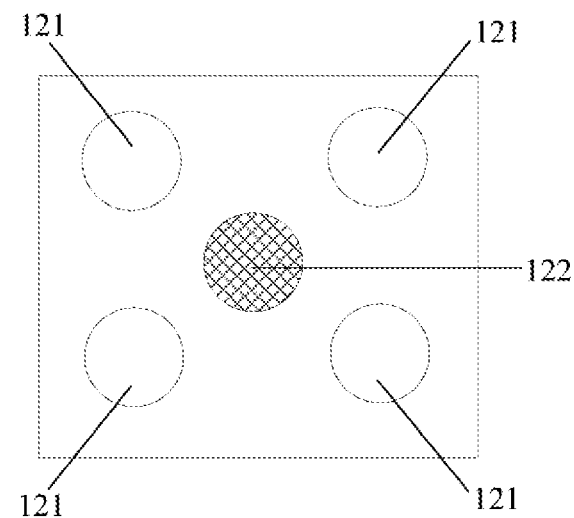
FIG. 6 is a second schematic structural diagram of a camera device according to an embodiment of the disclosure.

In some embodiments, as illustrated in FIG. 6, the camera device can include a plurality of depth cameras and a light emitter common thereto, where the plurality of depth cameras are arranged around the light emitter. Taking the structure as illustrated in FIG. 6 as an example, the camera device includes four depth cameras 121 arranged in a matrix, and the light emitter 122 is located at the center of the matrix. In a real application, there are preferably short distances between the light emitter 122 and the depth cameras 121, and theoretically their distances are preferably as short as possible to thereby avoid the ranging precision from being degraded due to a large distance between them. With the structure as illustrated in FIG. 6, there is the same distance between the light emitter 122 and the four depth cameras 121 so that there is the same structure of the respective depth cameras 121 combined respectively with the light emitter 122. Furthermore the depth-of-field ranges of the four depth cameras 121 are different from each other, and can be superposed one another in an ascending order of their distances from the light emitter, thus resulting in a consecutive depth-of-field range, which includes all the desirable depths of fields, so that clear imaging can be enabled in the full depth-of-field range.

Figure 7:
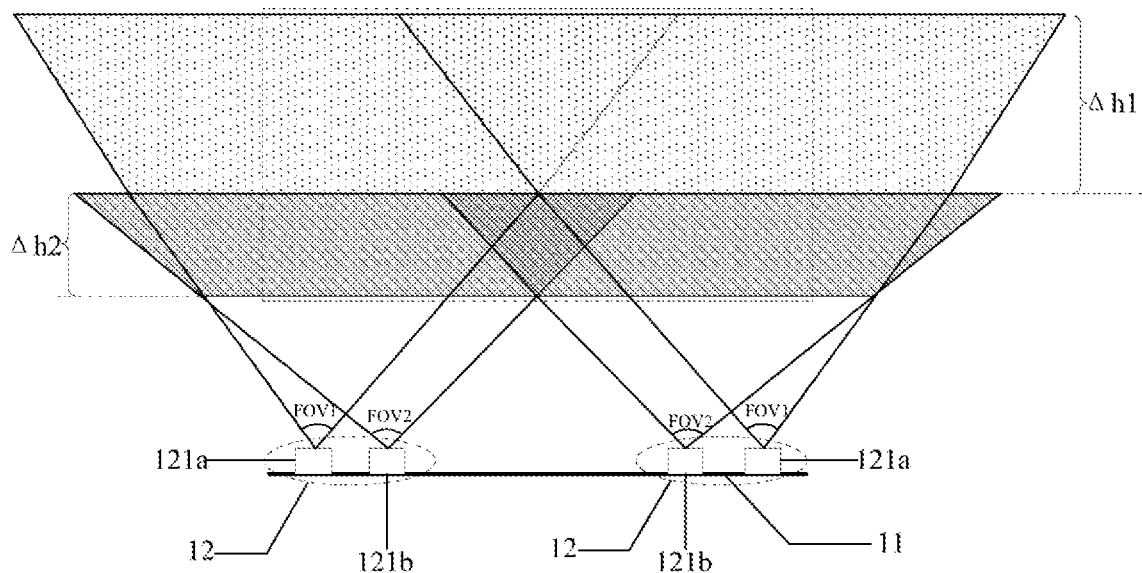
FIG. 7 is a second schematic diagram of a depth of field for imaging by the camera device according to the embodiment of the disclosure.

As can be appreciated, when there is a near depth-of-field range for photographing of a camera, it can photograph at a large angle of view; or when there is a far depth-of-field range for photographing of a camera, it can photograph at a small angle of view. When the camera has a too large angle of view, the quality of imaging by the camera may be inevitably affected, so it is typically difficult to include all the angles of views in a plane using only one camera device. In some embodiments, taking the structure as illustrated in FIG. 7 in a top view as an example, two camera devices 12 are arranged on a bezel of the display panel 11, and each camera device 12 includes two depth cameras 121a and 121b. The depth-of-field range of the depth camera 121a is Δh1, and the depth-of-field range of the depth camera 121b is Δh2, that is, the depth-of-field range of the depth camera 121a is farther than the depth-of-field range of the depth camera 121b. Furthermore the angle of view FOV1 of the depth camera 121a is smaller than the angle of view FOV1 of the depth camera 121b, where Δh1 and Δh2 are consecutive, so the depth-of-field range for photographing of one camera device 12 is Δh1+Δh2, but the largest angle of view for photographing of one camera device is FOV2, so using only one camera device 12 cannot include all the angles of views in a wide range corresponding to the front of the display panel 11, i.e., the rectangular dotted box as illustrated in FIG. 7. When two structurally identical camera devices 12 are employed, the two camera devices 12 are arranged symmetric, then imaging in a larger range can be enabled after their depth-of-field ranges and angles of views are spliced, so that all the angles of views in the rectangular dotted box can be included.

Figure 8:
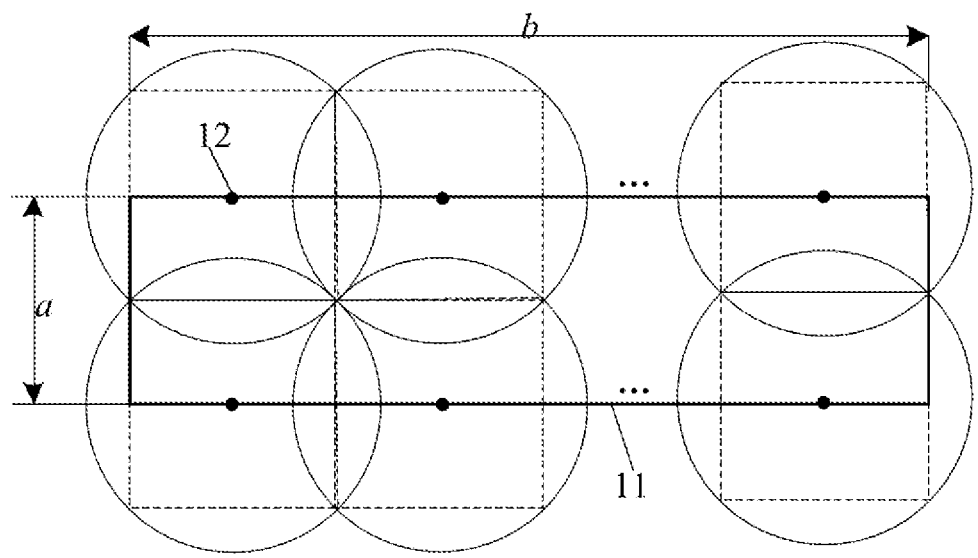
FIG. 8 is a schematic distribution diagram of camera devices according to an embodiment of the disclosure.

In some embodiments, when the display panel is a rectangular display panel, the respective camera devices can be arranged, e.g., arranged symmetric, on two longer sides b of the display device as illustrated in FIG. 8. When the camera devices are arranged on shorter sides a of the display panel, then the respective camera devices shall have larger angles of views, thus easily affecting the quality of imaging, so the camera devices can be arranged on the longer sides b of the display device. For example, 2n camera devices are arranged in the display device, where n camera devices are arranged on one longer side b of the display device, and the other n camera devices are arranged on the other longer side b thereof.

Here the angle of view of each camera device shall satisfy the relationship of:

$$FOV \geq 2 \arctan(a/\sqrt{2}h).$$

Where FOV is the angle of view of the camera device, h is a near depth-of-field of the camera device, and a is the length of a shorter side of the display device.

As illustrated in FIG. 8, when the camera devices are arranged on the longer sides of the display panel, the range of the largest angle of view of a camera device with the position thereof being the center of a circle is the range covered by a circle as illustrated in FIG. 8, where a point inside the circle can be photographed, and a point outside the circle cannot be photographed. In a real application, each point in a region, which is the same area as the display panel, in some range in front of the display panel, shall be imaged, so a plurality of camera devices need to be arranged on the longer sides b of the display device. When the respective camera devices are structurally identical, and include a plurality of depth cameras with their depths of fields for photographing being extensible, and there is a fixed angle of view for photographing for each camera device, i.e., FOV, then when the angle of view of each camera device 12 can cover at least the dotted square corresponding thereto, the full depth-of-field range can be covered as needed.

Figure 9:
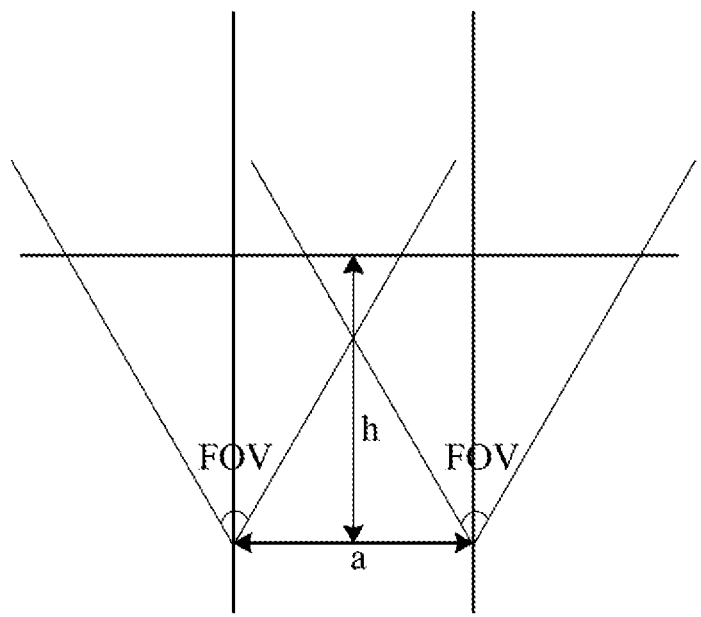
FIG. 9 is a first principle diagram of an angle of view of imaging by the camera device according to the embodiment of the disclosure.

As illustrated in FIG. 9, when the near depth of field of a camera device is h, half the angle of view thereof shall cover at least ½ length of a shorter side of the display panel, so the smallest angle of view of the camera device can be derived in the equation of:

$$\tan(FOV/2)=a/2h.$$

Then in a real application, the angle of view of each camera device shall satisfy the equation of:

$$FOV \geq 2 \arctan(a/\sqrt{2}h).$$

In some embodiments, given two camera devices arranged on two sides of a shorter side of the display panel, when the angles of views of the respective camera devices satisfy the equation above, the number of camera devices arranged on either longer side of the display panel is an integer more than or equal to b/a, where b is the length of a longer side of the display panel, and a is the length of a shorter side of the display panel. When b/a is an integer, then a number b/a of camera devices may be arranged; and when b/a is not an integer, then the smallest integer more than b/a may be taken, and for example, when b/a=1.5, two camera devices needs to be arranged.

Figure 10:
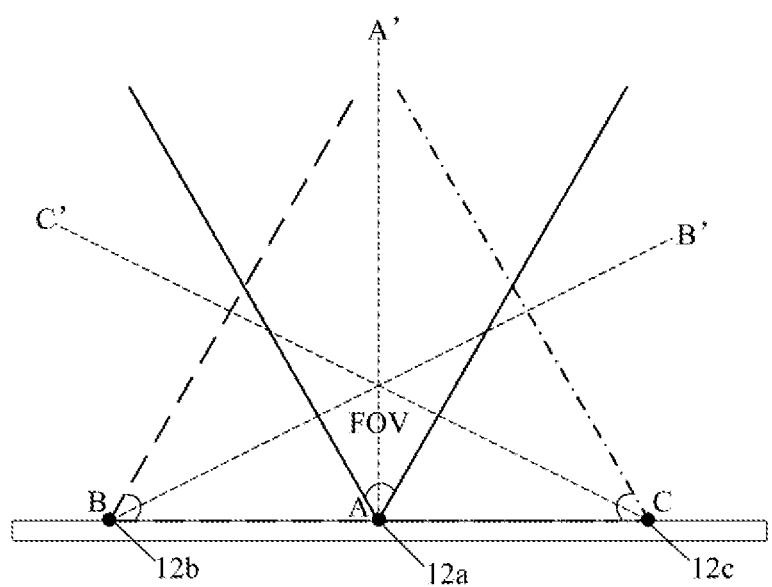
FIG. 10 is a second principle diagram of an angle of view of imaging by the camera device according to the embodiment of the disclosure.

In some embodiments, in the display device above, as illustrated in FIG. 10, there is a preset angle between the dominant optical axis of each of two camera devices on two ends of either longer side of the display panel and the longer side. Typically the dominant optical axes of the camera devices on the two ends can be rotated toward the center of the longer side by the preset angle. As described above, with the angle of view being larger, the quality of imaging by a camera device may be degraded accordingly, so the number of camera devices in use can be reduced in effect by rotating the angles of views of the camera devices on the ends of the longer side towards the center of the longer side. Thus a larger angle of view for photographing can be covered using a smaller number of camera devices to thereby lower power consumption of the display device.

Taking the structure as illustrated in FIG. 10 as an example, for example, common camera devices with a horizontal angle of view being 60 degrees, and a vertical angle of view being 45 degrees are applied. As illustrated in FIG. 10, the camera device 12a is arranged at the center of a longer side of the display panel, and the camera devices 12b and 12c are arranged on two ends of the longer side. The dominant optical axis AA' of the camera device 12a is perpendicular to the longer side of the display panel, and the dominant optical axis BB' of the camera device 12b, and the dominant optical axis CC' of the camera device 12c are rotated toward the center (where the camera device 12a is located). In the embodiment of the disclosure, the camera devices with a horizontal angle of view being 60 degrees is applied, so both the dominant optical axes of the camera devices 12b and 12c are rotated toward the center by 60 degrees, so that a full angle of view of 180 degrees can be covered.

In a particular implementation, the dominant optical axis of a camera device is rotated so that there is a preset angle between the dominant optical axis thereof and a longer side of the display panel, and in this way, the angles of views of the respective camera devices arranged on either longer side of the display panel can be superposed, thus resulting in a coverage range of 180 degrees or more. In the structure as illustrated in FIG. 10, the superposition of the angles of views can result in a coverage area of exactly 180 degrees, and when the dominant optical axes of the camera devices 12b and 12c above are rotated toward the center of the longer side by a larger angle, then the superposition of their angles of views may result in a coverage area of more than 180 degrees, although the embodiment of the disclosure will not be limited thereto.

Figure 11:
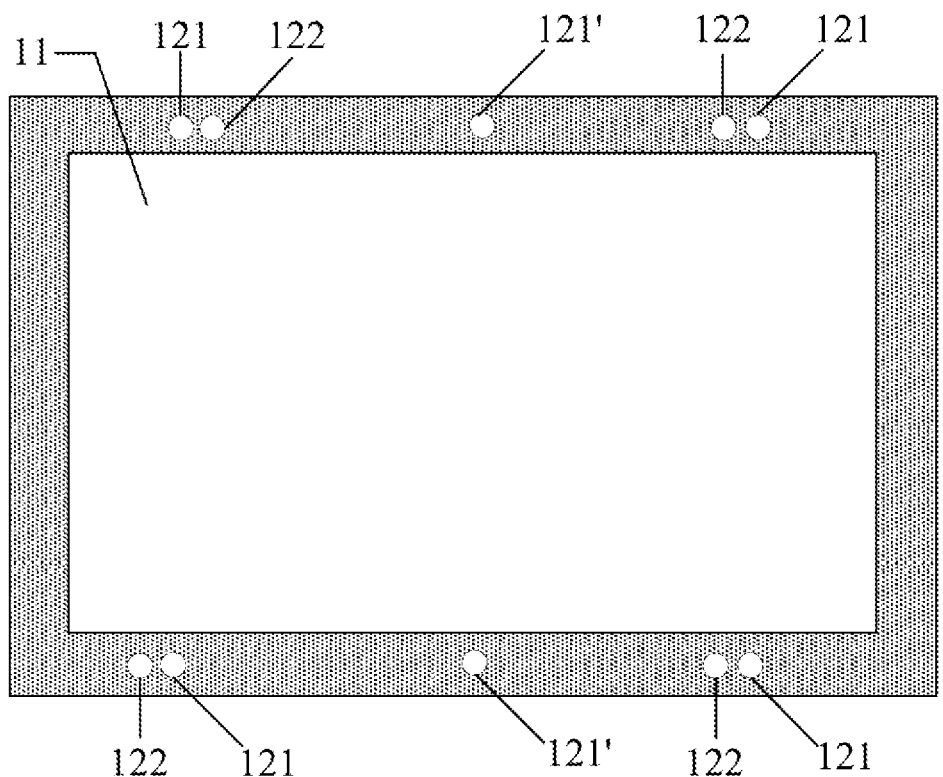
FIG. 11 is a second schematic structural diagram of the display device according to the embodiment of the disclosure in a front view.

In some embodiments, as illustrated in FIG. 11, the camera device can further include at least one wide-angle camera 121'. In order to detect the object omni-directionally, a plurality of camera devices need to be arranged, where each camera device includes a plurality of depth cameras. It needs more power-consuming to drive the plurality of groups of cameras concurrently, and it takes a long period of time for the processor to process a large amount of data for a large number of cameras, so one or more wide-angle cameras can be arranged in the camera device to thereby reduce the number of cameras to be used.

Figure 12:
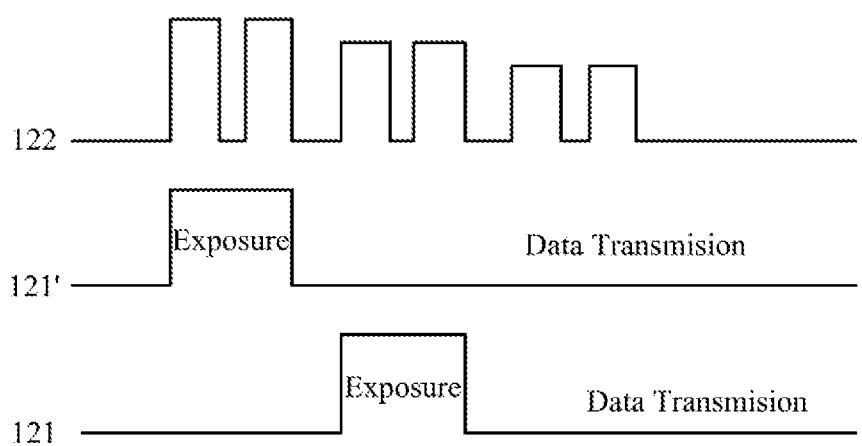
FIG. 12 is a second timing diagram of exposure according to an embodiment of the disclosure.

In some embodiments, the light emitter 122, the wide-angle camera 121', and the depth camera 121 can be driven according to the timing as illustrated in FIG. 12. Specifically the wide-angle camera 121' can be firstly driven to photograph the object; and image information captured by the wide-angle camera 121' can be analyzed for a rough positional range of the object, and the depth camera 121 which can photograph the determined positional range can be driven according to the positional range to photograph the object in the next frame, so that the precise position of the object is determined. In this way, the image information is processed to obtain a 3D image, and the 3D image is transmitted to the display panel for display in a 3D mode.

Figure 13:
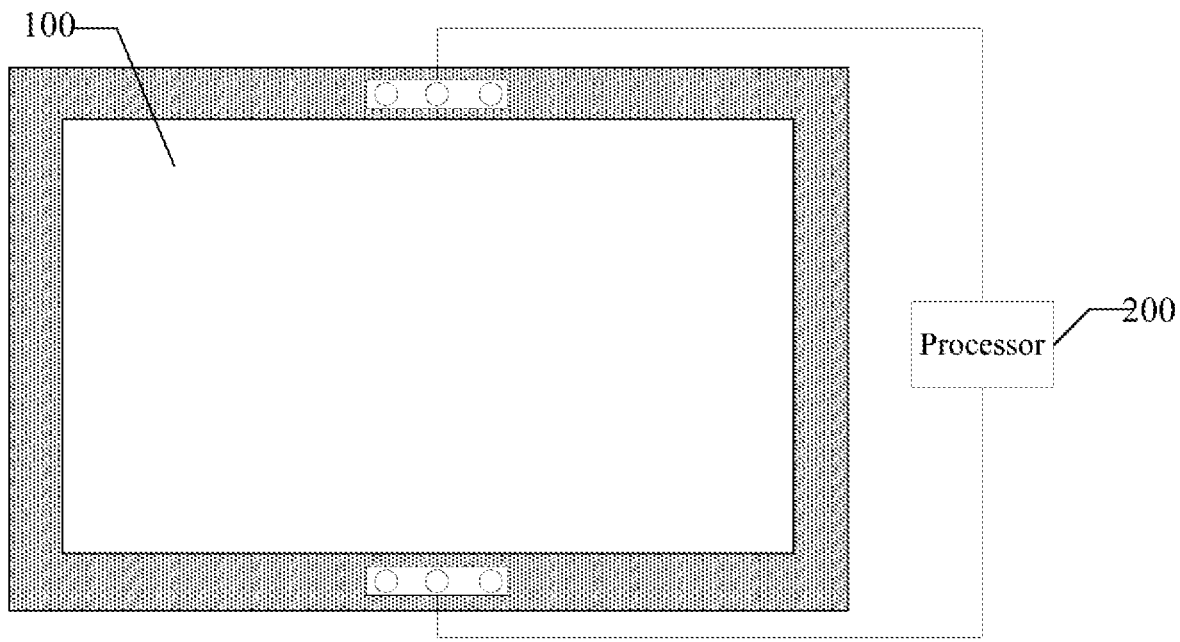
FIG. 13 is a schematic structural diagram of a display processing system according to an embodiment of the disclosure.

Based upon the same inventive idea, an embodiment of the disclosure further provides a display system as illustrated in FIG. 13. The display system can include the display device 100 according to any one of the embodiments above of the disclosure, and a processor 200. The display device includes a display panel and at least one camera device arranged on a periphery of the display panel, where each of the at least one camera device includes at least two depth cameras, and a depth-of-field range of any one of the depth cameras does not fully overlap with depth-of-field ranges of the other depth cameras; the processor is configured to receive image information captured by the at least one camera device in the display device, to process the image information to obtain a 3D image, and to transmit the 3D image to the display panel; the display panel is configured to display the 3D image.

The processor 200 can be a processor arranged outside the display device 100, and configured to transmit/receive data to/from the display device, e.g., an external computer, or processing chip, etc. Furthermore the processor 200 can alternatively be integrated inside the display device, and share the same display chip, etc., with the display panel in the display device. The processor 200 is electrically connected or data-connected with the respective camera devices and the display panel to thereby receive images of the respective camera devices, to process grayscale and depth information in the images to obtain a 3D image including an object, and to transmit the 3D image to the display panel for display in a 3D mode.

In some embodiments, in the display system above, the camera device further includes a light emitter adjacent to each of the depth cameras; the light emitter is configured to emit light at a preset wavelength to an object; and each of the depth cameras is configured to photograph the object, and to receive the light at the preset length reflected by the object to obtain the image information.

In some embodiments, in the display system above, the depth cameras in the same camera device share one light emitter.

In some embodiments, in the display system above, exposure times of the depth cameras in the same camera do not overlap with each other.

In some embodiments, in the display system above, exposure intensities as needed for the depth cameras in the same camera device increase with the growing depth-of-field ranges of the depth cameras; and emission intensity of the light emitter increases with the growing depth-of-field ranges of the depth cameras.

In some embodiments, in the display system above, the camera device includes a plurality of depth cameras arranged around the light emitter.

The detailed description of the display device in the display system may make reference to the embodiments of the above display device, a repeated description thereof will be omitted here.

Figure 14:
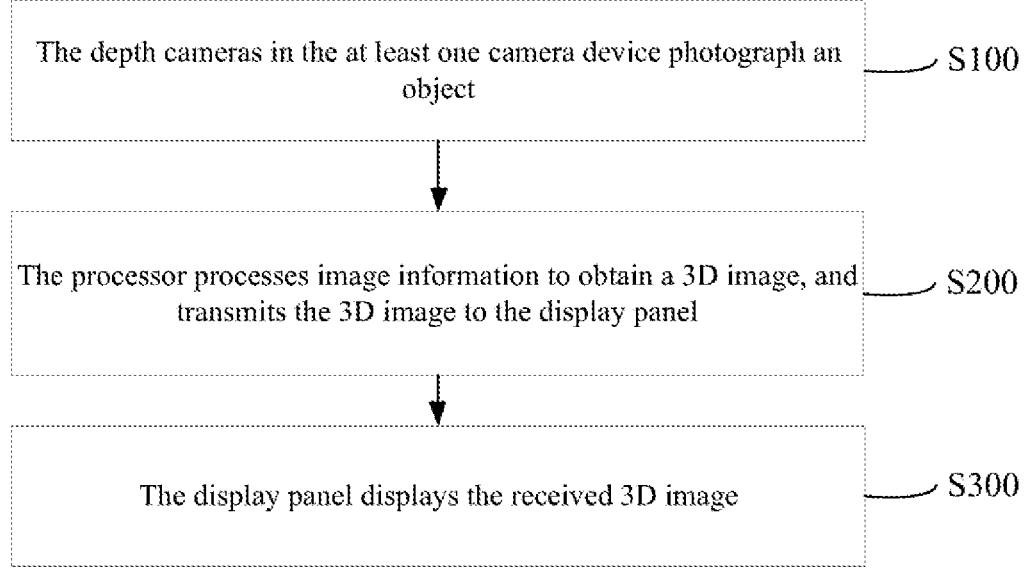
FIG. 14 is a schematic flow chart of a 3D display method on a display device according to an embodiment of the disclosure.

As illustrated in FIG. 14, an embodiment of the disclosure further provides a 3D display method based upon the display device according to any one of the embodiments above of the disclosure. The method can include the following steps.

In the step S100, the depth cameras in the at least one camera device photograph an object to obtain image information.

In the step S200, the processor processes image information to obtain a 3D image, and transmits the 3D image to the display device.

In the step S300, the display panel displays the received 3D image.

Since the camera device includes at least two depth cameras with their depth-of-field ranges which do not fully overlap with each other, and these depth cameras have high precision of photographing in the respective depth-of-field ranges, the respective camera devices can enable clear imaging in a wider depth-of-field range than the depth-of-field range of any one depth camera. The depth-of-field ranges of the respective depth cameras can be set as needed to thereby satisfy a demand for short-distance operation and interaction.

In some embodiments, in the display device above, the camera device can further include a light emitter adjacent to the respective depth cameras. In this case, the depth cameras in the at least one camera device can photo the object in the step S100 above specifically as follows.

The light emitter is driven in a time division mode in a descending order of emission intensities according to preset timing to emit a beam at a preset wavelength to the object, and the depth cameras in the at least one camera device are driven in sequence in a descending order of their depths of fields to photograph the object.

In some embodiments, the light emitter and the depth cameras can be driven according to the timing diagram as illustrated in FIG. 5, so that the light emitter is driven according to the timing dependent upon exposure intensities as needed for the depth cameras with the different depths of fields to emit light at different intensities, and the respective depth cameras can expose in sequence according to the timing in their optimum exposure states without affecting each other.

In some embodiments, the camera device above according to the embodiment of the disclosure can further include at least one wide-angle camera. In this case, the depth cameras in the at least one camera device can photograph the object in the step S100 above specifically as follows.

The at least one wide-angle camera photographs the object.

The processor analyzes image information captured by the at least one wide-angle camera, and determines a positional range of the object.

The depth camera corresponding to the positional range is driven according to the positional range to photograph the object.

In a real application, the wide-angle camera and the depth cameras are not driven in the same frame for photographing because after the wide-angle camera is driven to expose and photograph the object, the image data needs to be analyzed to thereby determine the rough position of the object so as to predetermine the positional range of the object. This operating process cannot be finished in the same frame for photographing, so there is no reserved period of time sufficient to drive the depth cameras to expose, and to transmit the images. In view of this, after the positional range is predetermined, the depth cameras which can photograph in the positional range can be driven in the next frame for photographing to thereby determine the precise position of the object.

In the display device, the display system, and the 3D display method according to the embodiments of the disclosure, the display device includes a display panel and at least one camera device arranged on the periphery of the display panel. The respective camera devices include at least two depth cameras, and a depth-of-field range of any one depth camera does not fully overlap with depth-of-field ranges of the other respective depth cameras; and the display panel is configured to display a 3D image formed by processing image information captured by the respective camera devices. Since the respective camera devices include at least two depth cameras with different depth-of-field ranges, where these depth cameras have high precision of photographing in the respective depth-of-field ranges, and the depth-of-field ranges of the respective depth cameras overlap with each other, thus resulting in a wider depth-of-field range than the depth-of-field range of any one depth camera, clear imaging can be enabled in the entire extended the depth-of-field range for photographing. The depth-of-field ranges of the respective depth cameras can be set as needed to thereby satisfy a demand for short-distance operation and interaction.

Although the preferred embodiments of this disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of this disclosure.

Evidently those skilled in the art can make various modifications and variations to this disclosure without departing from the spirit and scope of this disclosure. Thus this disclosure is also intended to encompass these modifications and variations thereto so long as the modifications and variations come into the scope of the claims appended to this disclosure and their equivalents.

What is claimed is:

1. A display device, comprising a display panel and at least one camera device arranged on a periphery of the display panel, wherein:
    each of the at least one camera device comprises at least two depth cameras, and a depth-of-field range of any one of the depth cameras does not fully overlap with depth-of-field ranges of the other depth cameras; and
    the display panel is configured to display a 3D image which is formed by processing image information captured by the at least one camera device;
    wherein the display panel is a rectangular display panel, and the at least one camera device is arranged on two longer sides of the display panel; and
    an angle of view of each camera device satisfies a relationship of:

$$FOV \geq 2 \arctan(a/\sqrt{2}h);$$

wherein FOV is the angle of view of the camera device, h is a near depth-of-field of the camera device, and a is a length of a shorter side of the display device.

2. The display device according to claim 1, wherein the camera device further comprises a light emitter adjacent to each of the depth cameras;
    the light emitter is configured to emit light at a preset wavelength to an object; and
    each of the depth cameras is configured to photograph the object, and to receive the light at the preset length reflected by the object to obtain the image information.

3. The display device according to claim 2, wherein the depth cameras in the same camera device share one light emitter.

4. The display device according to claim 3, wherein exposure times of the depth cameras in the same camera device do not overlap with each other.

5. The display device according to claim 3, wherein exposure intensities as needed for the depth cameras in the same camera device increase with the growing depth-of-field ranges of the depth cameras; and
    emission intensity of the light emitter increases with the growing depth-of-field ranges of the depth cameras.

6. The display device according to claim 3, wherein the camera device comprises a plurality of depth cameras arranged around the light emitter.

7. The display device according to claim 1, wherein the number of camera devices arranged on either longer side of the display panel is an integer more than or equal to b/a;
wherein b is a length of a longer side of the display panel, and a is the length of a shorter side of the display panel.

8. The display device according to claim 1, wherein an angle between a dominant optical axis of each of two camera devices on two ends of either longer side of the display panel and the longer side is preset.

9. The display device according to claim 8, wherein the angles of views of the camera devices arranged on either longer side of the display panel are superposed to result in a coverage range of 180 degrees or more.

10. The display device according to claim 1, wherein each camera device further comprises at least one wide-angle camera.

11. A three-dimension display method based upon the display device according to claim 1, the method comprising:
    photographing, by the depth cameras in the at least one camera device, an object to obtain image information;
    processing the image information to obtain the 3D image, and transmitting the 3D image to the display panel; and
    displaying, by the display panel, the 3D image;
    wherein the display panel is a rectangular display panel, and the at least one camera device is arranged on two longer sides of the display panel; and
    an angle of view of each camera device satisfies a relationship of:

$$FOV \geq 2 \arctan(a/\sqrt{2}h);$$

wherein FOV is the angle of view of the camera device, h is a near depth-of-field of the camera device, and a is a length of a shorter side of the display device.

12. The method according to claim 11, wherein the camera device further comprises a light emitter adjacent to each of the depth cameras; and
    the step of photographing comprises:
    driving the light emitter in a time division mode in a descending order of emission intensities according to preset timing to emit a light beam at a preset wavelength to the object, and driving the depth cameras in the at least one camera device in sequence in a descending order of their depths of fields to photograph the object.

13. The method according to claim 11, wherein the camera device further comprises at least one wide-angle camera; and
    the step of photographing comprises:
    photographing, by the at least one wide-angle camera, the object;
    analyzing image information captured by the at least one wide-angle camera, and determining a positional range of the object; and
    driving the depth camera corresponding to the positional range according to the positional range to photograph the object.

14. A display system, comprising a display device and a processor, wherein:
    the display device comprises a display panel and at least one camera device arranged on a periphery of the display panel, wherein:
    each of the at least one camera device comprises at least two depth cameras, and a depth-of-field range of any one of the depth cameras does not fully overlap with depth-of-field ranges of the other depth cameras;
    the processor is configured to receive image information captured by the at least one camera device in the display device, to process the image information to obtain a 3D image, and to transmit the 3D image to the display panel;

the display panel is configured to display the 3D image;

wherein the display panel is a rectangular display panel, and the at least one camera device is arranged on two longer sides of the display panel; and an angle of view of each camera device satisfies a relationship of:

$$FOV \geq 2 \arctan(a/\sqrt{2}h);$$

wherein FOV is the angle of view of the camera device, h is a near depth-of-field of the camera device, and a is a length of a shorter side of the display device.

15. The display system according to claim 14, wherein the camera device further comprises a light emitter adjacent to each of the depth cameras;

the light emitter is configured to emit light at a preset wavelength to an object; and each of the depth cameras is configured to photograph the object, and to receive the light at the preset length reflected by the object to obtain the image information.

16. The display system according to claim 15, wherein the depth cameras in the same camera device share one light emitter.

17. The display system according to claim 16, wherein exposure times of the depth cameras in the same camera device do not overlap with each other.

18. The display system according to claim 16, wherein exposure intensities as needed for the depth cameras in the same camera device increase with the growing depth-of-field ranges of the depth cameras; and emission intensity of the light emitter increases with the growing depth-of-field ranges of the depth cameras.

19. The display system according to claim 16, wherein the camera device comprises a plurality of depth cameras arranged around the light emitter.

* * * * *